J. J. PATTON.
TIRE.
APPLICATION FILED MAY 10, 1910.
979,882.
Patented Dec. 27, 1910.
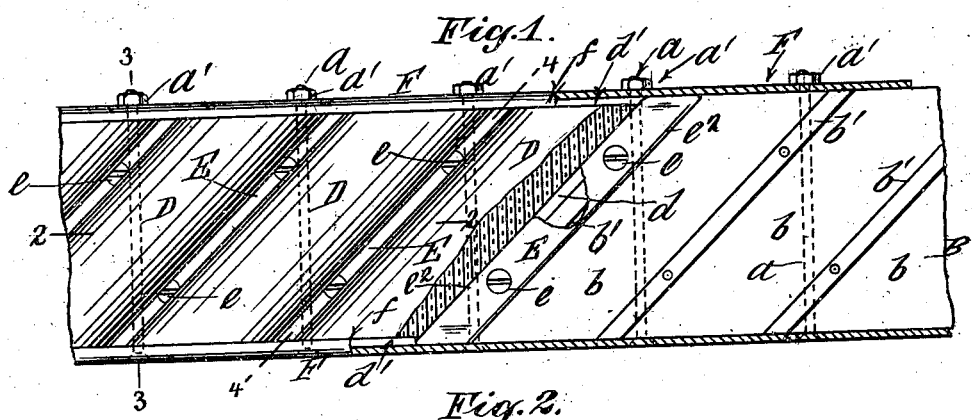
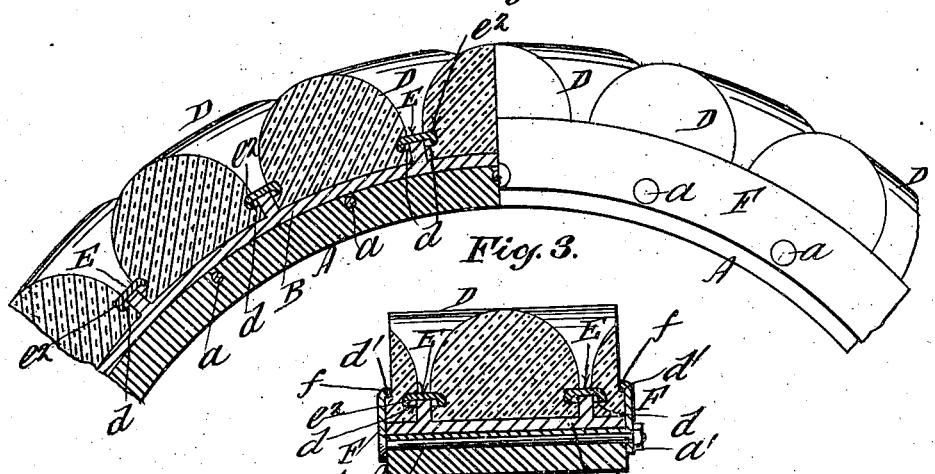
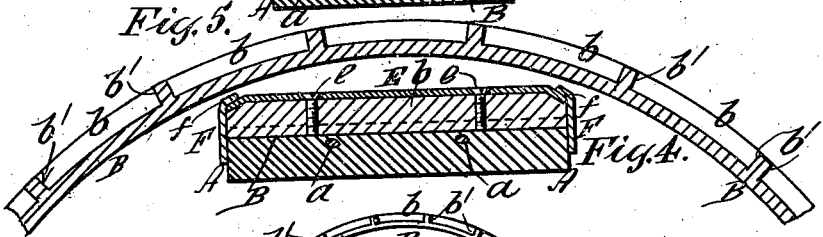
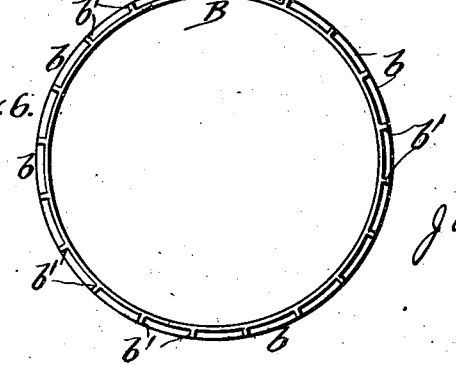
Witnesses:
Inventor:
John J. Patton
By his Attorney
Geo. Wm. Miatt

UNITED STATES PATENT OFFICE.

JOHN J. PATTON, OF NEW YORK, N. Y.

TIRE.

979,882.

Specification of Letters Patent. Patented Dec. 27, 1910.

Application filed May 10, 1910. Serial No. 560,468.

*To all whom it may concern:*

Be it known that I, JOHN J. PATTON, a citizen of the United States, residing in the borough of Manhattan, city, county, and State of New York, have invented certain new and useful Improvements in Tires, of which the following is a specification.

The object of my invention is to afford a tire having exceptional tractional and anti-skid qualities, adapted particularly to the conditions and requirements of heavy traction as in the case of auto-motors and vehicles designed for commercial transportation.

The invention consists in the specific construction, arrangement and combination of correlated parts herein after described and claimed specifically.

In the accompanying drawings, Figure 1, is a face view of a portion of my improved tire spread horizontally for convenience of illustration, and broken away in various places the better to show the structure; Fig. 2, is a sectional elevation of a portion of the tire, the sectional part being taken upon the plane of the line 2—2— Fig. 1; Fig. 3, is a section taken upon plane of the line 3—3— Fig. 1; Fig. 4, is a sectional view taken upon plane of the line 4—4— Fig. 1; Fig. 5, is a longitudinal section of a portion of the peripheral base tire plate; Fig. 6, is an elevation of the tire plate on a reduced scale.

A, represents any ordinary rim of a wheel, on the periphery of which is shrunk the tire base plate B, formed with the transverse channels $b$, in which are secured rubber or other elastic resilient material D, held in place by transverse cap flanges E, and circumferential side flange plates F.

The side walls $b'$, $b'$, of the channels $b$, are made integral with the tire base plate B, and form supports for the cap flange plates E, which are secured in position by set screws $e$, engaging with female screw threads formed for their reception directly within the flanges which constitute the side wall $b'$, $b'$, of the channel $b$. These set screws do not protrude into the wooden rim; and their heads are countersunk in the cap flange plates E, by preference, as shown in Fig. 4, although this is not absolutely essential.

The transverse channels $b$, preferably extend obliquely across the base plate B, and form seats for the treads D, which latter are made of rubber or other suitable elastic material. Each tread is formed with side shoulders $d$, $d$, upon which the protruding edges $e^2$, $e^2$, of the cap flanges rest. The ends of the treads D, are also formed with shoulders $d'$, $d'$, upon which the flanges $f$, of the circumferential side flange plates F, bear,— said flanges $f$, also bearing against the ends of the cap flange plates E.

The circumferential side flange plates F, are secured to the rim A, by screw bolts $a$, and nuts $a'$, and aid materially in establishing a rigid and substantial connection of parts, adapted to meet the requirements of heavy traction.

By arranging the treads obliquely across the rim, I attain a continuous contact anti-skid tire of exceptional traction qualities. The angle at which the treads cross the face of the tire, considered as a whole, should be approximately one of 45 degrees, depending somewhat on the width of the tire and the length of the tread, the object being to afford practically a continuous contact with the ground.

My construction and arrangement, as a whole, is very simple and effective,—the parts being few and substantial and affording a tire especially adapted to meet the arduous requirements of heavy traction. Furthermore, the operation of assembling and securing the parts is simplified and facilitated, while provision is made for the convenient removal and substitution of treads when desirable without the removal of other parts. That is to say a tread may be removed from above or radially and another substituted by simply slightly loosening one circumferential side flange plate F and the cap flange plates E, overlapping the particular tread channel $b$, involved, thus allowing a tread to be sprung out of position and another sprung into position without detaching either the side plate or the cap flange plates.

The one piece continuous annular base plate B, formed with the transverse rectangular ribs $b'$, $b'$, and shrunk directly upon the rim of the wheel forms a substantial, rigid bed or foundation for the support of the treads and the cap flange plates, and is an essential feature in my construction and arrangement of parts.

By seating the treads directly in the rectangular transverse channels in the shrunk-on base plate, and pressing and securing them therein by the cap flange plates E, screwed directly onto the channel side walls or partitions $b'$, $b'$, I obviate the use of individual channel pans, cores, etc., embedded or secured directly in or to each rubber tread; such devices not only being objectionable by reason of cost of construction but also tending to weaken the structure and shorten the life of the tire, because in practice such devices increase friction, heat the rubber, and increase the wear and tear of parts.

Another important feature of my improved tire structure is that the flanges $f$, on the circumferential side plates overlap and bear directly upon the ends of the cap flange plates E, thereby reinforcing the same and supplementing the screw bolts $e$, $e$, in attaining a rigid structure, as clearly shown in Fig. 4. In this connection it is to be noted that the bolts $a$, which secure the circumferential side flange plates F in position, extend at right angles to the screw bolts $e$, $e$, by which the caps are screwed to the side walls or partitions $b$,—an arrangement most effective in meeting and counteracting the radial strain arising from the alternate compression and expansion of the rubber treads during traffic, especially under exceptionally heavy load.

What I claim as my invention and desire to secure by Letters Patents is,

A wheel tire of the character designated, comprising a continuous one piece annular metallic base plate shrunk onto the rim of the wheel, formed with peripheral diagonal ribs which are rectangular in cross section, elastic resilient tread sections seated directly in the channels between the said diagonal ribs, said tread sections being formed with side and end shoulders, cap flange plates mounted upon, secured to, and overlapping said diagonal ribs and engaging the side shoulders of the said tread sections on either side, circumferential side plates formed with shoulders engaging the end shoulders on the tread sections, and bolts securing the said side plates to the rim of the wheel for the purpose and substantially in the manner described.

JOHN J. PATTON.

Witnesses:
 D. W. GARDNER,
 GEO. WM. MIATT.